(12) United States Patent
Piletsky et al.

(10) Patent No.: US 12,228,541 B2
(45) Date of Patent: Feb. 18, 2025

(54) ELECTROCHEMICAL SENSOR

(71) Applicant: UNIVERSITY OF LEICESTER, Leicester (GB)

(72) Inventors: Sergey Piletsky, Leicester (GB); Omar Sheej Ahmad, Leicester (GB); Alvaro Garcia Cruz, Leicester (GB)

(73) Assignee: UNIVERSITY OF LEICESTER, Leicester (GB)

( * ) Notice: Subject to any disclaimer, the term of this patent is extended or adjusted under 35 U.S.C. 154(b) by 947 days.

(21) Appl. No.: 16/972,306

(22) PCT Filed: Jun. 5, 2019

(86) PCT No.: PCT/GB2019/051551
§ 371 (c)(1),
(2) Date: Dec. 4, 2020

(87) PCT Pub. No.: WO2019/234417
PCT Pub. Date: Dec. 12, 2019

(65) Prior Publication Data
US 2021/0239643 A1 Aug. 5, 2021

(30) Foreign Application Priority Data
Jun. 6, 2018 (GB) .................................. 1809276

(51) Int. Cl.
*G01N 27/327* (2006.01)
*G01N 27/416* (2006.01)

(52) U.S. Cl.
CPC ..... *G01N 27/3277* (2013.01); *G01N 27/3278* (2013.01); *G01N 27/4168* (2013.01)

(58) Field of Classification Search
CPC .......... G01N 27/3277; G01N 27/3278; G01N 27/4168
See application file for complete search history.

(56) References Cited

U.S. PATENT DOCUMENTS

2013/0306485 A1* 11/2013 Varghese ........... G01N 33/6812
205/171
2015/0344607 A1 12/2015 Branger et al.

FOREIGN PATENT DOCUMENTS

WO 2016/140337 A1 9/2016

OTHER PUBLICATIONS

Mohorko et all, "Elevated Serum Levels of Cysteine and Tyrosine: Early Biomarkers in Asymptomatic Adults at Increased Risk of Developing Metabolic Syndrome," BioMed Research International vol. 2015, Article ID 418681, 14 pages (Year: 2015).*

(Continued)

*Primary Examiner* — Alexander S Noguerola
(74) *Attorney, Agent, or Firm* — BioPharma Law Group, PLLC; Joanna T. Brougher, Esq.

(57) ABSTRACT

An electrochemical sensor comprising first and second electrodes. The first electrode has a molecular imprinted polymer (MIP) immobilised thereon and the MIP comprises a redox label and is imprinted with an analyte. The disclosure also provides methods of producing such sensors, methods of detecting and determining the concentration of analytes and the use of the electrochemical sensors for the detection of analytes.

14 Claims, 5 Drawing Sheets

(56) References Cited

OTHER PUBLICATIONS

Luo et al., "Electrochemical sensor for bovine hemoglobin based on a novel graphene-molecular imprinted polymers composite as recognition element," Sensors and Actuators B 203 (2014) 782-789 together with Supplementary Information (Year: 2014).*
Xu et al., "Dopamine-Induced Reduction and Functionalization of Graphene Oxide Nanosheets," Macromolecules 2010, 43, 8336-8339 (Year: 2010).*
Alizadeh et al., "A ferrocene/imprinted polymer nanomaterial-modified carbon paste electrode as a new generation of gate effect-based voltametric sensor," New J. Chem., Mar. 21, 2018, 42, 4719 with Supplementary Information (Year: 2018).*
EPO machine—generated English language translation WO 2016/140337 A1 (Year: 2016).*
Online article entitled "How Big are Biochemical Nuts and Bolts?", author unknown, downloaded Jun. 15, 2024 from https://book.bionumbers.org/how-big-are-biochemical-nuts-and-bolts/#:~:text=Structurally%2C%20the%20glucose%20molecule%20is, (BNID%20110368%2C%20106979). (Year: 2024).*
Kunnus et al., "Viewing the Valence Electronic Structure of Ferric and Ferrous Hexacyanide in Solution from the Fe and Cyanide Perspectives," J. Phys. Chem. B 2016, 120, 7182-7194 (Year: 2016).*
Francesco Canfarotta et al., "Solid-phase synthesis of molecularly imprinted nanoparticles," Nature Protocols, vol. 11, No. 3, Feb. 11, 2016, pp. 443-455.
Sook Mei Khor et al., "The importance of interfacial design for the sensitivity of a label-free electrochemical immuno-biosensor for small organic molecules," Biosensors and Bioelectronics, vol. 26, 2011, pp. 2038-2044.
Bogdan-Cezar Iacob et al., "Study of the Molecular Recognition Mechanism of an Ultrathin MIP Film-Based Chiral Electrochemical Sensor," Electrochimica Acta, vol. 217, Sep. 2016, pp. 195-202.
John Rick et al., "Using protein templates to direct the formation of thin-film polymer surfaces," Biosensors and Bioelectronics, vol. 22, 2006, pp. 544-549.
Ademar Wong et al., "Development of an Electrochemical Sensor Modified with MWCNT-COOH and MIP for Detection of Diuron," Electrochimica Acta, vol. 182, Sep. 2015, pp. 122-130.
Lisa A. Hawver et al., "Specificity and complexity in bacterial quorum-sensing systems," FEMS Microbiology Reviews, vol. 40, No. 5, 2016, pp. 738-752.
Bhim Bali Prasad et al., "Ultra-trace analysis of D- and L- aspartic acid applying one-by-one approach on a dual Imprinted electrochemical sensor," Sensors and Actuators B, vol. 240, 2017, pp. 631-639.
Marvin Whiteley et al., "Progress in and promise of bacterial quorum sensing research," Nature, vol. 551, Nov. 2017, pp. 313-320.
Lu Chen et al., "New immobilisation protocol for the template used in solid-phase synthesis of MIP nanoparticles," Applied Surface Science, vol. 406, Feb. 2017, pp. 115-121.
Alessandro Poma et al., "Advances in the manufacture of MIP nanoparticles," Trends in Biotechnology, vol. 28, No. 12, Dec. 2010, pp. 629-637.
Iva Chianella et al., "Direct Replacement of Antibodies with Molecularly Imprinted Polymer Nanoparticles in ELISA—Development of a Novel Assay for Vancomycin," Analytical Chemistry, vol. 85, Aug. 2013, pp. 8462-8468.
Alessandro Poma et al., "Solid-Phase Synthesis of Molecularly Imprinted Polymer Nanoparticles with a Reusable Template—"Plastic Antibodies"," Advanced Functional Materials, vol. 23, 2013, pp. 2821-2827.
F. Canfarotta et al., "Nano-sized molecularly imprinted polymers as artificial antibodies," Chapter 1 in Molecularly Imprinted Polymers for Analytical Chemistry Applications, 2018, pp. 1-27.
GB Search Report dated Dec. 5, 2018, GB Application No. 1809276.7, pp. 1-3.
PCT International Search Report and Written Opinion dated Aug. 20, 2019, PCT Application No. PCT/GB2019/051551, pp. 1-16.
Amin Fatoni et al., "A novel molecularly imprinted chitosanacrylamide, graphene, ferrocene composite cryogel biosensor used to detect microalbumin," Analyst, vol. 139, No. 23, 2014, pp. 6160-6167.
Jun Matsui et al., "SPR Sensor Chip for Detection of Small Molecules Using Molecularly Imprinted Polymer with Embedded Gold Nanoparticles," Analytical Chemistry, vol. 77, No. 13, 2005, pp. 4282-4285.
Elisabetta Mazzotta et al., "Solid-phase synthesis of electroactive nanoparticles of molecularly imprinted polymers. A novel platform for indirect electrochemical sensing applications," Sensors and Actuators B: Chemical, vol. 229, 2016, pp. 174-180.
Silvia Rebocho et al., "Development of a ferrocenyl-based MIP in supercritical carbon dioxide: Towards an electrochemical sensor for bisphenol A," The Journal of Supercritical Fluids, vol. 135, 2018, pp. 98-104.
Communication pursuant to Article 94(3) EPC; Office Action issued by the European Patent Office on May 6, 2024.
Kim, Dong-Min, et al. "A potentiometric non-enzymatic glucose sensor using a molecularly imprinted layer bonded on a conducting polymer." Biosensors and Bioelectronics 91 (2017): 276-283.

* cited by examiner

Figure 6

ELECTROCHEMICAL SENSOR

CROSS REFERENCE TO RELATED APPLICATIONS

This application is a National Stage of International Application No. PCT/GB2019/051551 filed on Jun. 5, 2019, which claims priority to GB Application No. 1809276.7 filed on Jun. 6, 2018. The contents of the above applications are incorporated herein by reference in their entirety.

The invention relates to electrochemical sensors. The invention is particularly concerned with electrochemical sensors comprising molecularly imprinted polymers (MIPs). The invention also extends to methods of producing such sensors, methods of detecting and determining the concentration of analytes and the use of electrochemical sensors of the invention for the detection of analytes.

Molecularly imprinted polymers (MIPs) are produced by polymerising monomers in the presence of a template (analyte). Templates can be small organic or inorganic molecules, peptides, proteins, viruses or cells. During polymerization monomers form a self-assembled complex with the template according to their size, polarity and functionality which became "frozen" in a three-dimensional network. After synthesis template molecules are extracted, creating in polymer network binding sites (imprints) capable of binding to the template or its analogues. The synthesized MIPs could be used as a substitute to natural antibodies and receptors in range of applications (see patent US20030027936 and References 1 and 2).

The main challenges for the development and commercialisation of MIP-based sensors remain: (i) developing suitable protocol for transforming polymer-template binding event into a detectable electrical signal, and (ii) need to deliver satisfactory solutions as to how MIPs can be economically manufactured and integrated into sensor devices.

In biosensors, redox markers are used to facilitate electron transport between enzyme catalytic sites and electrode surface and in this way transform biorecognition and catalytic effects into detectable electric signal. Redox markers have low oxidation and reduction potential and their use helps minimising interference from unwanted electroactive species. Historically soluble redox markers were used in combination with MIPs for indirect detection of effects related to polymer-template interactions. Thus it is known that binding of template to the imprinted polymer reduces permeability of redox marker such as ferricyanide to an electrode coated with MIPs, and this can be used to measure concentration of an analyte.[11] In one experiment displacement of ferricyanide adsorbed in MIP binding sites by the template was used to measure concentration of an analyte.[12] The conductivity of such MIPs is affected by the presence of template-analyte. In these examples MIPs were synthesised by bulk polymerisation and then attached on the sensor surface or directly deposited onto electrodes by electropolymerisation. In one example MIPs formed by bulk polymerisation was ground and powder mixed with graphite ink to produce screen-printed electrodes.[15] This approach however causes problems including poor repeatability, high interference, cross-reactivity and batch-to-batch variation, which all stem from imprinting in bulk. Traditional bulk MIPs are characterized by a slow binding kinetics toward their targets: these aspects can in some cases result in a low output and slow signal response.[16] In one experiment, redox MIP micro particles were prepared in supercritical $CO_2$ and used in electrochemical sensors for the detection of bisphenol A.[17] Differential pulse voltammetry was used to detect oxidation of adsorbed bisphenol A. Microparticles are however insoluble in most of solvents and their integration with sensors, such as screen-printed electrodes is not a trivial task.

There is therefore a need for improved MIP-based sensors.

Accordingly, in a first aspect of the invention, there is provided an electrochemical sensor comprising first and second electrodes, wherein the first electrode has a molecular imprinted polymer (MIP) immobilised thereon and the MIP comprises a redox label and is imprinted with an analyte.

Advantageously, binding of the analyte to the MIP results in a conformational change in the MIP, such that the number of redox labels exposed to the first electrode is altered. The inventors have found that detection of the change in density of electroactive moieties on polymer-electrode interface is a more convenient and reliable approach than detecting change in diffusion of soluble redox markers through the polymer film triggered by polymer-template interactions. The sensor of the first aspect exhibits improved repeatability, low interference, no or low cross-reactivity and reduced batch-to-batch variation.

Furthermore, the apparatus of the first aspect allows the use of MIPs instead of antibodies and enzymes. This is advantageous as MIPs exhibit high stability and long operational and shelf-life. Furthermore, the generic nature of polymerisation means that MIPs can be made for any target. The inventors have also found that MIPs may be easy functionalised with the redox label.

The skilled person may understand that an "electrochemical sensor" is a device configured to detect the presence of and/or measure the concentration of an analyte via electrochemical oxidation and/or reduction reactions.

Preferably the MIP is a bulk MIP, microMIP, or nanoMIP. Most preferably, the MIP is a nanoMIP. The nanoMIP may be a particle with a diameter of at least 1 nm, more preferably at least 5 nm, and most preferably at least 20 nm. The nanoMIP may be a particle with a diameter of less than 999 nm, more preferably less than 500 nm, and most preferably less than 250 nm. The nanoMIP may be a particle with a diameter of between 1 nm and 999 nm, more preferably between 5 nm and 500 nm and most preferably between 20 nm and 250 nm. It may be appreciated that the diameter may be measured in the absence of the analyte.

Preferably, the analyte is selected from the group consisting of a bioanalyte, a pharmaceutical, a pesticide, an explosive.

More preferably, the analyte is selected from the group consisting of a biological receptor, nucleic acid, cell, spore, virus, microorganism, tissue sample, carbohydrate, oligosaccharide, polysaccharide, protein, peptide, nucleoprotein, mucoprotein, lipoprotein, synthetic protein, glycoprotein, glucosaminoglycan, steroid, hormone, immunosuppressant, heparin, antibiotic, vitamin, biomarker of a pathological or disease state, toxin, pesticide, herbicide, insecticide, fungicide, explosive, nerve agent, pollutant, endocrine disrupting compound, nucleotide, nucleoside, oligonucleotide, metabolite, secondary metabolite, drug metabolite, drug intermediate or drug or any other class of analyte known to those skilled in the art.

Most preferably, the analyte is selected from the group consisting of a protein, a glycoprotein, a sugar, a virus, a bacterium, drug of abuse and a metabolite.

The analyte may be tetrahydrocannabinol (THC), morphine, N-butyryl-L-homoserine lactone ($C_4$—HSL), glucose or trypsin.

The redox label may be a molecule, or a component part of the MIP, which is capable of undergoing an oxidation or reduction reaction.

The redox label may be a dye (e.g., methylene blue, meta-tolulene diamine indophenol, carotene), a quinone, a free transition metal, a conjugated π-electron molecule, a complex with d- and f-electrons, a carbon nanotube or graphene.

One type of suitable redox label is a transition metal compound or complex. A suitable transition metal compound may be an osmium, ruthenium, iron or cobalt compounds or complexes. Alternatively, or additionally, the redox label may comprise a metallocene, such as a ferrocene. In a preferred embodiment, the redox label comprises ferrocenylmethyl methacrylate (FMMA).

Alternatively, the redox label may be a derivative of a phenoxazine, such as 7-dimethylamino-1,2-benzophenoxazine, 1,2-benzophenoxazine, Nile Blue, Brilliant Cresyl Blue, tetramethylphenylenediamine, dichlorophenolindophenol, N-methyl phenazonium salts, tetrazolium salts, phenothiazines, for example, toluidine blue. Alternatively, or additionally, the redox label may be a stable quinone or species that in their oxidized state have quinoid structures, such as Nile Blue and indophenol. Examples of suitable quinones may include, for example, polymerisable derivatives of naphthoquinone, phenoquinone, benzoquinone, naphthenequinone, and the like. Other suitable quinone derivatives may include, for example, acenaphthenequinone and ubiquinones. Alternatively, the redox label may be Taylor's blue (i.e. 1,9-dimethylmethylene blue), N,N'-diethylthiacyanine iodide, or thionine.

The redox labels may be bound or otherwise immobilised on the MIPs surface by any method known to those skilled in the art, for example by covalent attachment of the redox label to the MIP or by entrapment of the redox mediator in the MIP.

The redox label may also be anchored onto the polymer surface by interaction with the imprinted site, created by using a mediator molecule as a primary or secondary template during MIP formation. Redox mediators may also be anchored onto the polymer surface by forming a complex between polymer functionalities and transition metal compounds. Suitable polymer functionalities include nitrogen-containing heterocycles, such as pyridine, imidazole, or derivatives thereof for binding as ligands to the redox species. Suitable vinyl functional groups include vinylic heterocycles, amides, nitriles, carboxylic acids, sulfonic acids, or other polar vinylic compounds. The mediator may be formed by coordination of polymeric functionalities with osmium, ruthenium, or cobalt 2, 2'-bipyridyl complex.

The MIP may comprise a plurality of redox labels. Preferably, the redox label comprises less than 30 wt % of the MIP, more preferably less than 20 wt % or 10 wt % of the MIP and most preferably less than 5 wt % of the MIP. Preferably, the redox label comprises at least 0.1 wt % of the MIP, more preferably at least 0.5 wt % or 1 wt % of the MIP and most preferably at least 2 wt % of the MIP. Preferably, the redox label comprises between 0.1 and 30 wt % of the MIP, more preferably between 0.5 and 20 wt % or between 1 and 10 wt % of the MIP, and most preferably between 2 and 5 wt % of the MIP.

As mentioned above, binding of the analyte to the MIP may result in a conformational change in the MIP. Accordingly, the MIP may be configured to swell and/or shrink upon binding of the analyte. Preferably, the MIP is configured to swell upon binding of the analyte. Accordingly, the diameter of the MIP may increase by at least 1% upon binding of the analyte, more preferably by at least 5% or at least 10% upon binding of the analyte, and most preferably at least 20% upon binding of the analyte. The diameter of the MIP may increase by between 1% and 50% upon binding of the analyte, more preferably by between 5% and 40% or between 10% and 35% upon binding of the analyte, and most preferably between 20% and 30% upon binding of the analyte.

Preferably, the electrochemical sensor is configured to detect the concentration, or number, of redox labels exposed to the first electrode. The electrochemical sensor may be configured to detect the concentration, or number, of redox labels exposed to the first electrode by detecting a signal response. The electrochemical sensor may be configured to measure a signal response by being configured to measure a change in signal from a predetermined baseline level.

The electrochemical sensor may comprise a power supply configured to apply a voltage across the first and second electrodes. The power supply could comprise a battery, a generator, a renewable power source or it could comprise the national grid.

Preferably, the signal response is a change in potential difference, impedance, capacitance and/or current between the first and second electrodes. Accordingly, the electrochemical sensor may comprise a voltmeter configured to measure the potential difference between the first and second electrodes, an LCR meter configured to measure the inductance, capacitance and resistance between the first and second electrodes, a multimeter configured to measure the capacitance between the first and second electrodes an amperometer configured to measure the current between the first and second electrodes and/or a potentiostat configured to control potential difference and measure the current flow between the first and second electrodes.

Preferably, the electrochemical sensor is configured to measure differential pulse voltammetry (DPV), cyclic voltammetry (CV), electrochemical impedance spectroscopy (EIS), square wave voltammetry (SWV), amperometry and/or any other electrochemical technique that would be known to those skilled in the art.

Preferably, the MIP is immobilised on the surface of the first electrode. The MIP may be immobilised on the surface of the first electrode due to the presence of one or more covalent bonds, coordinate bonds or mechanical bonds. The skilled person may understand that a mechanical bond may also be known as a physical bond, and is a bond which would locks the MIP to the surface of the first electrode without a chemical bond being present. For instance, the MIP may be entrapped in a pore or conductive matrix on the surface of the first electrode.

The first and second electrodes may comprise a metal and/or carbon. The metal may comprise copper, silver, gold, tin oxide, indium or platinum. The carbon may comprise graphite, graphene, carbon nanotubes, or glass carbon.

The MIP may be formed from monomers selected from vinyl monomers, allyl monomers, acetylenes, acrylates, and/or methacrylates.

Suitable monomers may be selected by screening a monomer library using molecular mechanics.[1] Cross-linking monomers are usually included to stabilize binding sites and give rigidness to the structure. Representative examples of cross-linkers suitable for MIPs include ethylene glycol dimethacrylate, methylene bisacrylamide and N,N'-bisacryloylpiperazine. MIPs can be prepared by living radical polymerization producing micro and nanoparticles. Conveniently nanoMiPs can be synthetized via controlled living polymerisation[3-4] at the surface of a solid phase containing immobilised template.[5]

The inventors believe that the first electrode is novel per se.

Accordingly, in accordance with a second aspect, there is provided an electrode with a molecular imprinted polymer (MIP) immobilised thereon, wherein the MIP comprises a redox label and is imprinted with an analyte.

Preferably, the electrode, MIP, redox label and analyte are as described in relation to the first aspect.

In a third aspect of the invention, there is provided a method of producing the electrode of the second aspect, the method comprising:

polymerising a plurality of monomers in the presence of an analyte to form a polymer;

extracting the analyte from the polymer to expose analyte binding sites in the polymer, thereby providing a MIP; and immobilising the imprinted MIP onto an electrode to produce the electrode of the second aspect, wherein the plurality of monomers are polymerised in the presence of a redox label, or the polymer is contacted with a redox label after polymerisation.

Polymerisation may be initiated for example by heating, by applying current (electropolymerisation), by the addition of redox catalyst(s), by irradiation, including gamma radiation or by microwave radiation or preferably by irradiation with UV or visible light.

Preferably, the polymerisation is a living radical polymerisation, living anionic or cationic polymerisation or controlled polycondensation. The method of polymerisation would be known to those skilled in the art.

Preferably, the polymerisation is living radical polymerisation. Examples of living radical polymerisation includes: nitroxide-mediated polymerisation (NMP), atom-transfer radical polymerisation (ATRP) and reversible addition-fragmentation chain-transfer polymerisation (RAFT).

The living polymerisation process allows for the use of iniferters (initiator transfer-agent terminator) which may be made in conjunction with conventional initiators to confer a living nature to the polymerisation. Iniferters can be photoiniferters bearing a dithiocarbamyl group or thermal-iniferters carrying carbon-carbon or azo groups or other types of compound known to those skilled in the art.

Preferably, polymerisation is performed by (i) using appropriate stoichiometric ratio between initiator and monomers; (ii) cooling the reaction or removing the source of UV or other irradiation, which will terminate the formation of new propagating species at an early stage of the reaction; (iii) removal of the monomers from contact with the growing polymer chain e.g., by filtration or chromatography; (iv) adding inhibitors to the reaction; (v) performing polymerisation in very dilute solution; (vi) adding chain transfer agents.

Preferably, the plurality of monomers comprise one or more monomers selected from the group consisting of: vinyl monomers, allyl monomers, acetylenes, acrylates, methacrylates, acrylamides, methacrylamides, chloroacrylates, itaconates, trifluoromethylacrylates, derivatives of amino acids, nucleosides, nucleotides, and carbohydrates.

Preferably, the plurality of monomers are polymerised in the presence of the redox label. Preferably, the redox label comprises a monomer within the plurality of monomers. Preferably, the redox label is a molecule comprising a double or triple bond. Accordingly, the redox label will form a component of the resultant polymer. The redox label may be as defined in relation to the first aspect. Preferably, the redox label comprises less than 30 wt % of the plurality of monomers, more preferably less than 20 wt % or 10 wt % of the plurality of monomers and most preferably less than 5 wt % of the plurality of monomers. Preferably, the redox label comprises at least 0.1 wt % of the plurality of monomers, more preferably at least 0.5 wt % or 1 wt % of the plurality of monomers and most preferably at least 2 wt % of the plurality of monomers. Preferably, the redox label comprises between 0.1 and 30 wt % of the plurality of monomers, more preferably between 0.5 and 20 wt % or between 1 and 10 wt % of the plurality of monomers, and most preferably between 2 and 5 wt % of the plurality of monomers.

Alternatively, the polymer may be contacted with a redox label after polymerisation. Preferably, the redox label is coupled to the polymer. Accordingly, the redox label will form a component of the resultant polymer.

Preferably, polymerisation is performed in the presence or on the surface of particles containing double bonds or immobilised initiator.

Preferably, the plurality of monomers comprise a cross-linking monomer. Advantageously, the cross-linking monomer fixes or stabilises the structure of the binding sites, so that it remains complementary to that of the analyte. The cross-linking monomer may be selected from the group consisting of: ethylene glycol dimethacrylate, trimethylolpropane trimethacrylate, divinylbenzene, methylene bisacrylamide, ethylene bisacrylamide and N,N'-bisacryloylpiperazine.

The cross-linking monomer may comprise particles or precursor polymers containing double bonds, or particles or polymers with multiple functionalities attached which can bind to functional monomers. Preferably, the level of cross-linking is moderate to allow swelling and/or shrinking of the nanoparticles during release and re-binding of the analyte. Those skilled in the art would be capable of selecting monomers and cross-linkers suitable for a particular system. Alternatively a variety of combinatorial and computational methods could be used to assist in this selection.

Preferably, the cross-linking monomer comprises at least 1 wt % of the plurality of monomers, more preferably at least 2 wt % of the plurality of monomers, and most preferably at least 5 wt %. Preferably, the cross-linking monomer comprises less than 80 wt % of the plurality of monomers, more preferably less than 40 wt % of the plurality of monomers, and most preferably less than 20 wt % of the plurality of monomers. Preferably, the cross-linking monomer comprises between 1 and 80 wt % of the plurality of monomers, more preferably between 2 and 40 wt % of the plurality of monomers, and most preferably between 5 and 20 wt % of the plurality of monomers.

Preferably, the MIP and analyte are as described in relation to the first aspect.

The analyte may be in solution or immobilised on a surface. The surface may be a polymeric, polysaccharide or glass surface. For example, the analyte may be immobilised on beads, fibres, membranes, capillaries or any other suitable surface known to those skilled in the art.

The MIP may be immobilised onto the electrode by chelating the MIP to the electrode surface. Accordingly, the method may comprise contacting the electrode surface and the MIP with a metal ion and allowing coordinate bonds to form therebetween.

Alternatively, the MIP may be immobilised to the electrode by physically adsorbing the MIP onto the electrode surface. Preferably, the MIP contains a functionality that has a high affinity to the electrode surface. For example, the functionality may be a thiol (SH) group, which forms strong bonds with a gold or silver surface.

Alternatively, or additionally, the MIPs may be trapped between metal or carbon particles. Preferably the metal particles comprise copper, silver, gold, tin oxide, indium or platinum, most preferably gold. Preferably, the carbon particles comprise graphite, graphene, carbon nanotubes, or, glass carbon, most preferably graphite.

Alternatively, the MIP may be immobilised by physical adsorption using fabrication techniques known in the art, such as screen-printing, ink-jet printing, digital printing, spin-coating, electroplating, piezoelectric printing, laser printing, photolithography, sputtering, painting, micro and nano contact printing. Such technologies may make use of conductive ink. MIPs with anchored redox labels may also be trapped by coating with polyelectrolyte. For example, MIPs may be integrated in several micro-technologies based on metal or metal oxide using a metal paint ink. The metal paint ink may be a copper, silver, gold, tin oxide, indium or platinum paint ink, and is most preferably a gold paint ink. In such embodiments, the MIP may be contacted with a metal polymer electrode paste, contacted with the surface of the electrode and then the electrode and MIP may be cured. The metal polymer electrode paste may be a copper, silver, gold, tin oxide, indium or platinum polymer electrode paste, and most preferably is a gold polymer electrode paste. Preferably, after the MIP has been contacted with the metal polymer electrode paste it is drop cast onto the surface of the electrode. Preferably, the electrode and MIP are cured at a temperature of at least 50° C., more preferably at least 60° C. or at least 70° C., and most preferably at least 75° C. Preferably, the electrode and MIP are cured at a temperature of between 50° C. and 120° C., more preferably between 60° C. and 100° C. or between 70° C. and 90° C., and most preferably between 75° C. and 85° C. Preferably, the electrode and MIP are cured for at least 5 minutes, more preferably at least 10 minutes or at least 20 minutes, and most preferably at least 25 minutes. Preferably, the electrode and MIP are cured for between 5 minutes and 60 minutes, more preferably between 10 minutes and 50 minutes or between 20 minutes and 40 minutes, and most preferably between 25 minutes and 35 minutes.

Accordingly, MIPs may be mixed with conductive ink, and subsequently immobilised onto the surface of the electrode by screen printing, inkjet printing or 3D printing.

However, in a preferred embodiment, the MIP is immobilised to the electrode by covalently bonding the MIP to a surface of the electrode. Prior to covalently bonding the MIP to the surface of the electrode, the method may comprise functionalising or activating the electrode surface. For example, a metal electrode may be functionalized using for example, an amine, such as cystamine, or a carboxylic acid, such as thioctic acid. When the metal electrode surface is functionalized with cystamine, nanoMIPs containing carboxylic group are activated by 1-ethyl-3-(3-dimethylaminopropyl)-carbodiimide hydrochloride (EDC) to form a reactive O-acylisourea which reacts with the gold-bound amine to form an amide. Similarly, when the gold electrode surface is functionalized with thioctic acid, the carboxylic acid functional group can be activated with EDC to bind a polymer amine to form an amide.

In a fourth aspect of the invention, there is provided a method of detecting an analyte, the method comprising:

disposing first and second electrodes in a solution comprising an analyte, wherein the first electrode has a molecular imprinted polymer (MIP) immobilised thereon and the MIP comprises a redox label and is imprinted with the analyte;

allowing the analyte to bind to the MIP; and measuring a signal response to confirm the presence of the analyte.

Preferably, the electrodes, MIP, analyte, redox label and signal response are as described in relation to the first aspect.

The method of the fourth aspect may be used to determine the concentration of the analyte. Accordingly, the method may comprise a further step of comparing the signal response to one or more signal responses caused by a known concentration of the analyte and thereby determining the concentration of the analyte.

The analyte may be associated with a disease. Accordingly, the method of the fourth aspect may provide an improved means of prognosis or diagnosis of the disease.

Preferably, the analyte is glucose and the disease to be diagnosed or prognosed is diabetes.

In a fifth aspect of the invention, there is provided the use of the electrochemical sensor of the first aspect for detecting, or determining the concentration of an analyte.

Preferably, the analyte is as described in the first aspect.

All of the features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying Figures, in which:—

EXAMPLE 1—PREPARATION OF NANOMIPS VIA SOLID-PHASE SYNTHESIS 200 g of glass beads were incubated in boiling 4.0 M sodium hydroxide for 15 min, washed with deionised water and dried at 150° C. Activated glass beads were incubated for 10 hour in a solution 2% (v/v) of N-[3-(trimethoxysilyl) propyl]ethylenediamine (DAMO), and 0.33% of 1,2-bis (triethoxysilyl)ethane (BTSE) in toluene at 70° C., washed with acetone and dried at 150° C. Glass beads were immersed into 0.1 M MES buffer, pH 6.0 containing 0.01 M N-(3-dimethylaminopropyl)-N'-ethylcarbodiimide hydrochloride (EDC) and 3.6 mM N-hydroxysuccinimide (NHS), and mixed with 0.03 M dodecanedioic acid dissolved in DMF for 20 min. After that beads were washed with 50% DMF and acetone. The template was immobilised on the glass beads by incubation in 0.43 mM (S)-(−)-α-amino-γ-butyrolactone hydrobromide and 0.43 mM of sodium carbonate. Glass beads with immobilised template were washed with water and dried under vacuum. Monomer mixture was prepared by mixing 1.44 g of methacrylic acid (MAA), 1.62 g of ethylene glycol dimethacrylate (EGDMA), 1.62 g of trimethylolpropane trimethacrylate (TRIM), 0.37 g of N,N-diethyldithiocarbamic acid benzyl ester (DABE), 0.09 g of pentaerythritol-tetrakis-(3-mercaptopropionate) (PETMP), and 0.14 g of ferrocenylmethyl methacrylate (FMMA) and deoxygenating with nitrogen for 10 min. Glass beads with immobilised template (25 g) were degassed in vacuum for 20 min and coated with monomer mixture. Polymerisation was initiated by exposing the mixture to UV-light for 2 min (Philips model HB/171/A, 4×15 W/amps). After polymerisation, the crude of reaction was transferred into a solid phase extraction (SPE) cartridge fitted with a polyethylene frit (20 mm porosity) and washed with cold acetonitrile at 0° C. in order to remove monomers, residues and low affinity nanoparticles. The high affinity nanoMIPs were extracted by elution at 6° C.

In examples 2 to 4 the template was tetrahydrocannabinol (THC), morphine or N-butyryl-L-homoserine lactone ($C_4$—HSL).

EXAMPLE 2—DLS ANALYSIS OF NANOMIPS

700 μL of nanoMIPs (0.02 mg/mL) in water, prepared according to example 1, which were imprinted with either THC (THC nanoMIPs) or morphine (morphine nanoMIPs) were mixed with 350 μL of water, and optionally 95 μM THC or morphine and briefly sonicated. The hydrodynamic size of nanoMIPs was measured by dynamic light scattering (DIS) with a ZetaSizer Nano ZS (Malvern Instruments Inc, UK). NanoMIPs conformational changes triggered by the analyte are shown in Table 1.

TABLE 1

DLS results for nanoMIPs and nanoNIPs in solution and loaded with THC and Morphine molecules.

| Nanoparticle sample | Diameter (nm) | PDI* |
|---|---|---|
| THC nanoMIPs | 307.3 ± 2.5 | 0.323 |
| THC nanoMIPs in the presence of THC | 379.2 ± 6.4 | 0.295 |
| THC nanoMIPs in the presence of morphine | 265.8 ± 3.2 | 0.261 |
| Morphine nanoMIPs | 195.4 ± 4.4 | 0.156 |
| Morphine nanoMIPs in the presence of THC | 179.3 ± 8.7 | 0.278 |
| Morphine nanoMIPs in the presence of morphine | 208.3 ± 4.5 | 0.363 |

*Polydispersity index (PDI)

Figure 1:
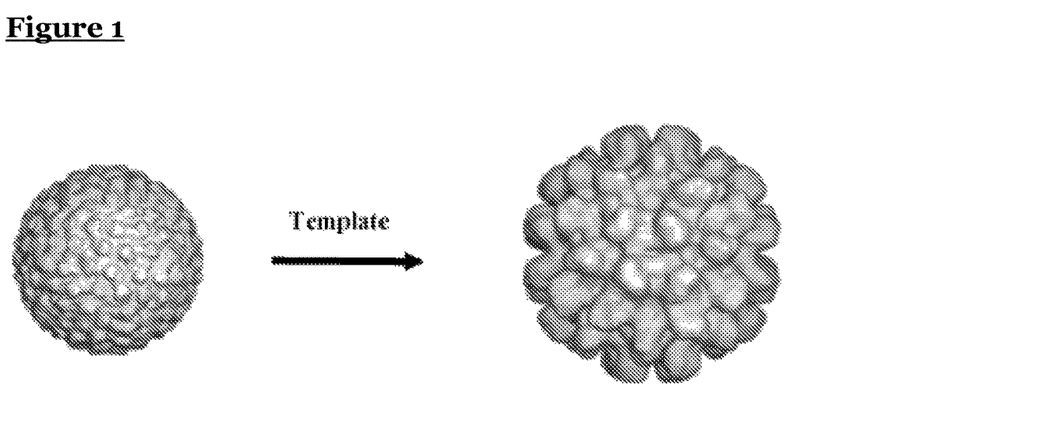
FIG. 1 shows a schematic representation of the change in polymer conformation triggered by interaction with a template.

As shown in the table, the diameter of the nanoMIPs increases in the presence of the molecule with which it has been imprinted, i.e. the template molecule. This is shown schematically in FIGS. 1 and 2.

EXAMPLE 3—IMMOBILIZATION OF NANOMIPS

NanoMIPs prepared according to example 1, were immobilised on gold electrodes using one of two methods.

(i) Gold electrodes (Drop-Sense gold electrodes DRP-250AT (aux.: Pt ref.: AgCl) were functionalized by incubation in 3 mM solution of crystamine in ethanol for 8 hours. Functionalised electrodes were incubated for 30 min in 100 μL solution containing 0.03 mg/mL of nanoMIPs, 0.4 M N-(3-Dimethylaminopropyl)-N'-ethylcarbodiimide hydrochloride (EDC) and 0.1M N-hydroxysuccinimide (NHS) in 50 mM PBS.

(ii) NanoMIPs (3.6 mg/mL in acetonitrile) were mixed with 200 mg of gold polymer electrode paste (C2041206P2, Gwent Group U.K.) and spread over gold electrodes (Drop-Sense gold electrodes DRP-250AT (aux.: Pt ref.: AgCl). Electrodes were cured at 8° C. for 30 minutes.

EXAMPLE 4—ELECTROCHEMICAL MEASUREMENTS OF SMALL MOLECULES

NanoMIPs imprinted with $C_4$-HSL were prepared according to example 1 and immobilised on gold electrodes by covalent attachment according to example 3.

All experiments were carried out using an Autolab11 Instruments, Netherland. Differential pulse voltammetry (DVP) was performed under the following experimental conditions: potential was recorded in the range of −0.4 to +0.8 V and the step potential and modulation amplitude at 50 mV. The current signal was measured at the redox potential of the redox marker in nanoMIPs (0.22 V vs AgCl).

Figure 3A:
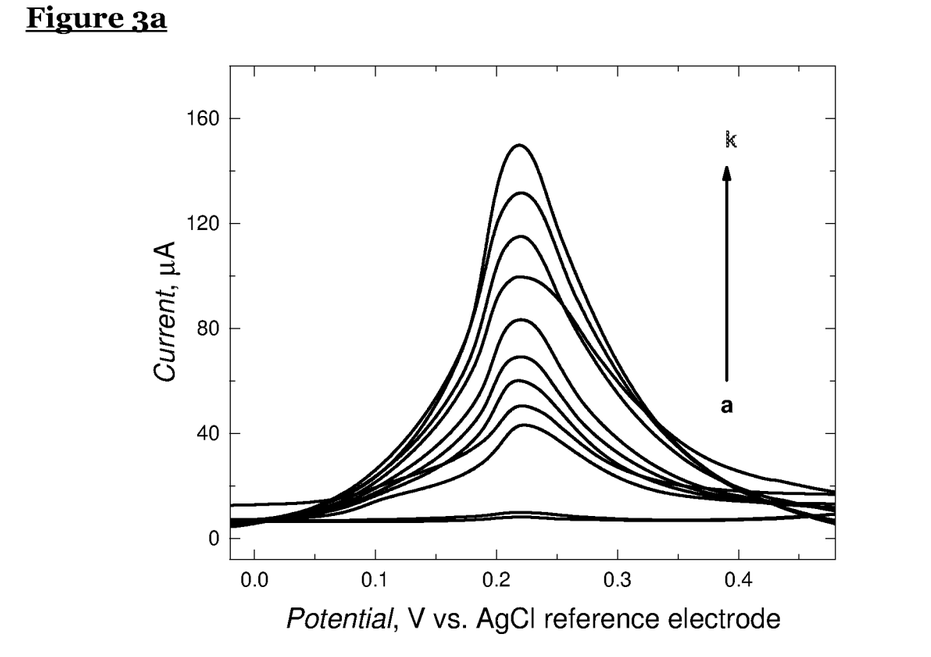
FIG. 3a shows the current response of the nanoMIPs with anchored ferrocenylmethyl methacrylate (FMMA) to N-butyryl-L-homoserine lactone ($C_4$—HSL), wherein the concentration of $C_4$-HSL is (a) 0 μM, (b) 0.1 μM, (c) 0.2 μM, (d) 0.4 μM, (e) 0.8 μM, (f) 1.6 μM, (g) 3.2 μM, (h) 6.2 μM, (i) 12.5 μM, (j) 25 μM, or (k) 50 μM. The redox potential was measured at 0.23 V (vs AgCl) on screen printed electrodes.
Figure 3B:
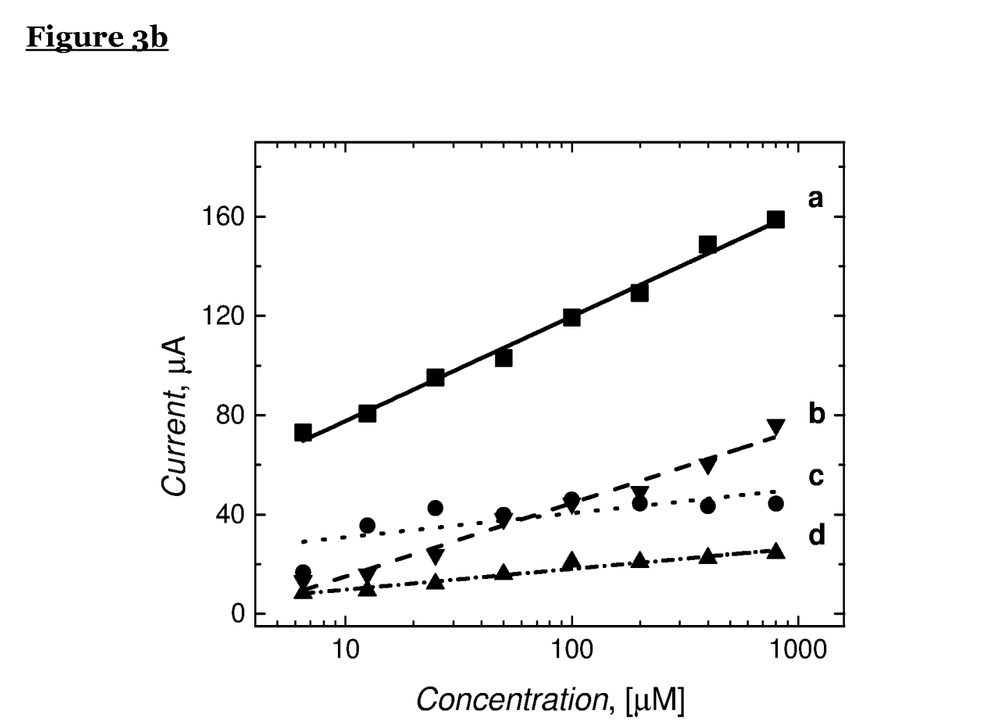
FIG. 3b shows calibration plots showing the sensor response of nanoMIPs with anchored FMMA to NAHSLs in the concentration range 6.25-400 μM, wherein the NAHSLs are (a) $C_4$-HSL, (b) C6-HSL, (c) GBL and (d) 3-oxo-C6-HSL.

DPV responses of nanoMIP-coated electrodes to $C_4$-HSL solutions at concentrations between 0 and 50 μM are presented in FIG. 3a. The nanoMIPs with anchored FMMA showed good response to the template with a sensitivity of 47.5 μA/μM ($R^2$=0.998) and LOD of 0.13 μM. The sensor response of nanoMIPs-coated electrode to different homoserine lactones is shown in FIG. 3b. The calibration plots demonstrate good selectivity of sensor for $C_4$-HSL.

EXAMPLE 5—SYNTHESIS OF NANOMIPS IMPRINTED WITH TRYPSIN

For the polymerization mixture the following monomers were dissolved in 100 ml of water: 39 mg (0.214 mmol) of N-isopropylacrylamide (NIPAM), 6 mg (0.078 mmol) of N,N-methylene-bis-acrylamide (MBA), 2.2 μL (0.0224 mmol) of acrylic acid (AAc), 6 mg (0.0211 mmol) of ferrocenylmethyl methacrylate (FMAA) and 5.8 mg (0.0325 mmol) of N-(3-aminopropyl) methacrylamide hydrochloride (NAPMA). Additionally, 33 mg (0.264 mmol) of tert-butyl acrylamide (TBAM) dissolved in 2 mL ethanol were added to the aqueous mixture. The solution was sonicated for 5 min, and then purged with nitrogen for 30 min. 50 mL of the polymerization mixture were added to 60 g of trypsin-derivatized glass beads. Polymerization was initiated by addition of 0.5 mL of (60 mg/mL) ammonium persulfate and (30 μL/mL) tetramethylethylenediamine and continued at room temperature for 1 hour. Beads were decanted into solid phase extraction cartridge and washed with water (10 bead volumes, 50 mL). The SPE cartridge was then placed in water bath at 60° C. for 7 min and high affinity nanoMIPs eluted with water at 6° C. (5 bead volumes, 20 mL). The concentration of the nanoMIPs fractions was evaluated by freeze-drying of solution aliquots and weighing.

EXAMPLE 6—ELECTROCHEMICAL MEASUREMENTS OF TRYPSIN

All experiments were carried out using an Autolab11 Instruments, Netherland using a gold electrode prepared using nanoMIPs prepared according to example 5 and the method described in Example 3(i). Differential pulse voltammetry (DVP) was performed under the following experimental conditions: potential was recorded in the range of −0.4 to +0.8 V and the step potential and modulation amplitude at 50 mV. The current signal was measured at the redox potential of the redox marker in nanoMIPs (0.22 V vs AgCl).

Figure 4A:
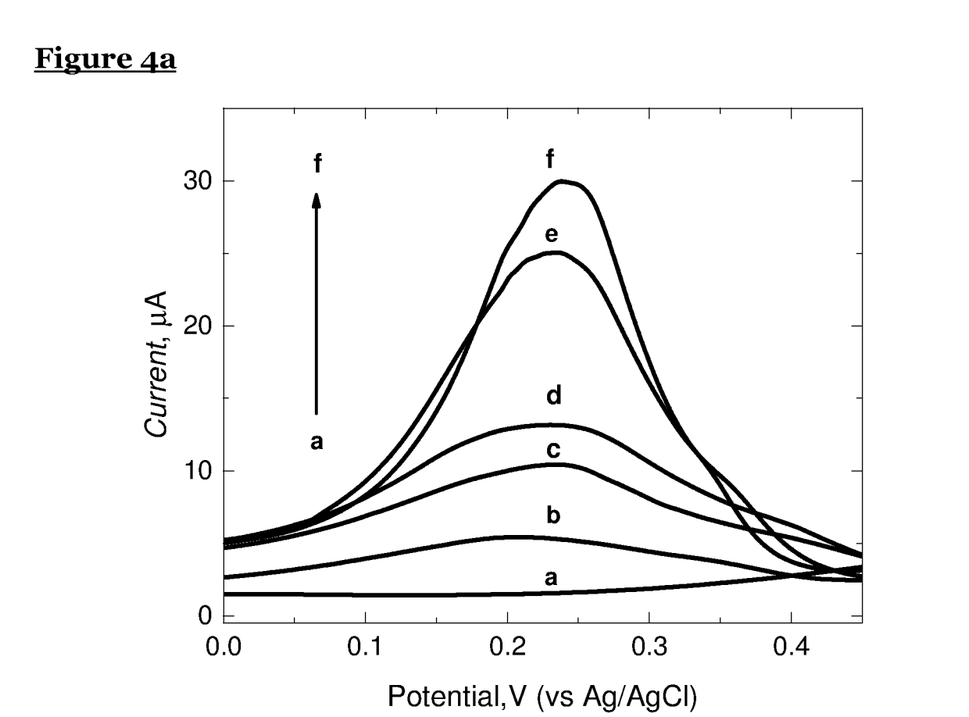
FIG. 4a shows DPV measurements on a nanoMIPs modified gold electrode for trypsin solution, wherein the concentration of trypsin in 5 mM PBS is (a) 0 μM, (b) 0.006 μM, (c) 0.012 μM, (d) 0.025 μM, (e) 0.05 μM or (f) 100 μM.
Figure 4B:
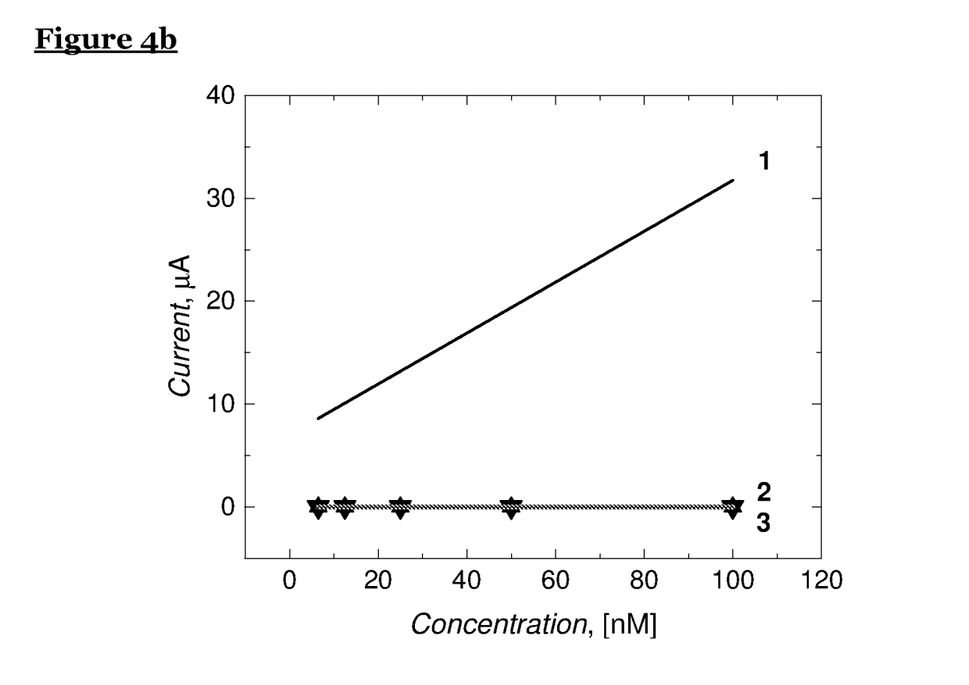
FIG. 4b shows the response of nanoMIPs using DPV measurements for (1) Trypsin, (2) Avidin and (3) Pepsin in a concentration ranging from 6.5 to 100 nM in 5 mM PBS.

DPV responses of nanoMIP-coated electrodes to trypsin solutions are presented in FIG. 4a. The calibration curve shows the good sensitivity for trypsin 0.25 nM/μA ($R^2$=0.998) and LOD of 0.15 μM. The responses from avidin ($3.95 \times 10^{-8}$ nM, $R^2$=0.897) and pepsin ($8.8 \times 10^{-8}$ nM, $R^2$=0.577) are negligible, six orders of magnitude lower compared to the trypsin as shown in FIG. 4b. This shows that the system exhibits good sensitivity for trypsin.

EXAMPLE 7—SYNTHESIS OF NANOMIPS IMPRINTED WITH GLUCOSE

The monomer mixture was composed by 39 mg (0.214 mmol) of N-isopropylacrylamide (NIPAM), 6 mg (0.078 mmol) of N,N-methylene-bis-acrylamide (MBA), 33 mg (0.264 mmol) of tert-butyl acrylamide (TBAM), 2.2 μL (0.022 mmol) acrylic acid (AAc), 39 mg of N-iopropylacrylamide (NIPAM), 7 mg (0.028 mmol) of ferrocenylmethyl methacrylate (FMAA), 5.8 mg (0.033 mmol) of N-(3-aminopropyl) methacrylamide hydrochloride (NAPMA) and 30 mg (0.167 mmol) of glucose. The components were dissolved in 100 mL 2% ethanol in water (v/v), sonicated for 5 min, then degassed using nitrogen for 30 min. The polymerisation was initiated by the addition of a solution comprising 30 mg (0.132 mmol) ammonium persulfate (APS) and 30 μL (0.2 μmol) of N,N,N',N'-tetramethylethane-1,2-diamine (TEMED) in 0.5 mL of water. The monomer mixture was allowed to polymerize at ambient temperature (25° C.) for 1 hour. Subsequently, MIP was washed with water 7 times in a centrifuge cartridge filter (10 kDa) to remove template and unreacted monomers. Next, the fractions of high affinity nanoparticles were collected.

EXAMPLE 8—ELECTROCHEMICAL MEASUREMENTS OF GLUCOSE

All experiments were carried out using an Autolab11 Instruments, Netherland using a gold electrode prepared using nanoMIPs prepared according to example 7 and the method described in Example 3(i). Differential pulse voltammetry (DVP) was performed under the following experimental conditions: potential was recorded in the range of −0.4 to +0.8 V and the step potential and modulation amplitude at 50 mV. The current signal was measured at the redox potential of the redox marker in nanoMIPs (0.22 V vs AgCl).

Figure 5A:
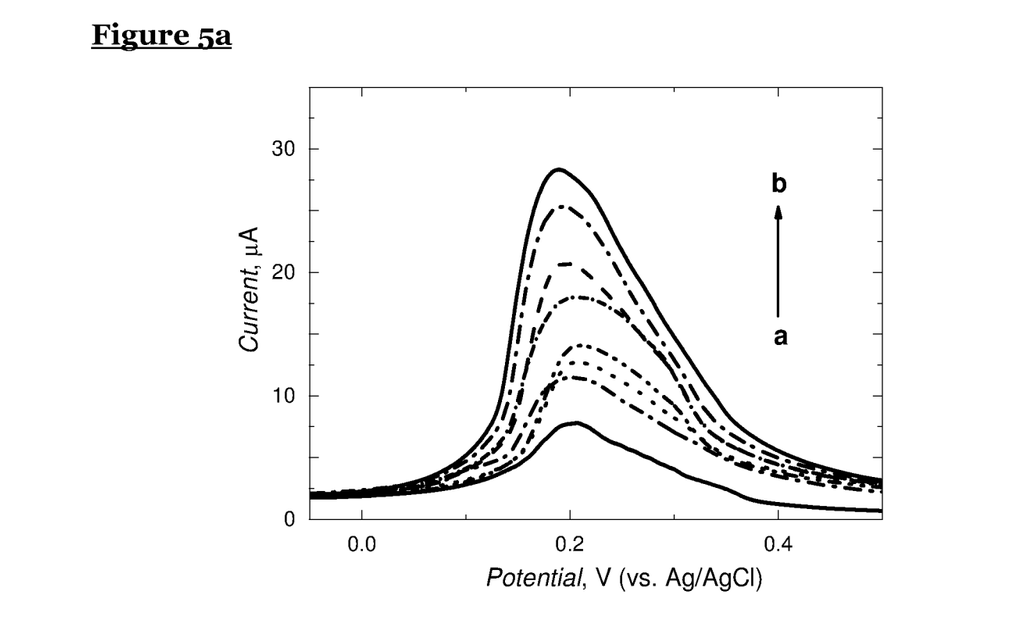
FIG. 5a shows DPV measurements on nanoMIPs immobilised on gold electrodes, wherein the concentration of DPV in 5 mM PBS is (a) 0.8 mM, (b) 1.6 mM, (c) 3.2 mM, (d) 6 mM, (e) 12.5 mM, (f) 25 mM, or (g) 50 mM.
Figure 5B:
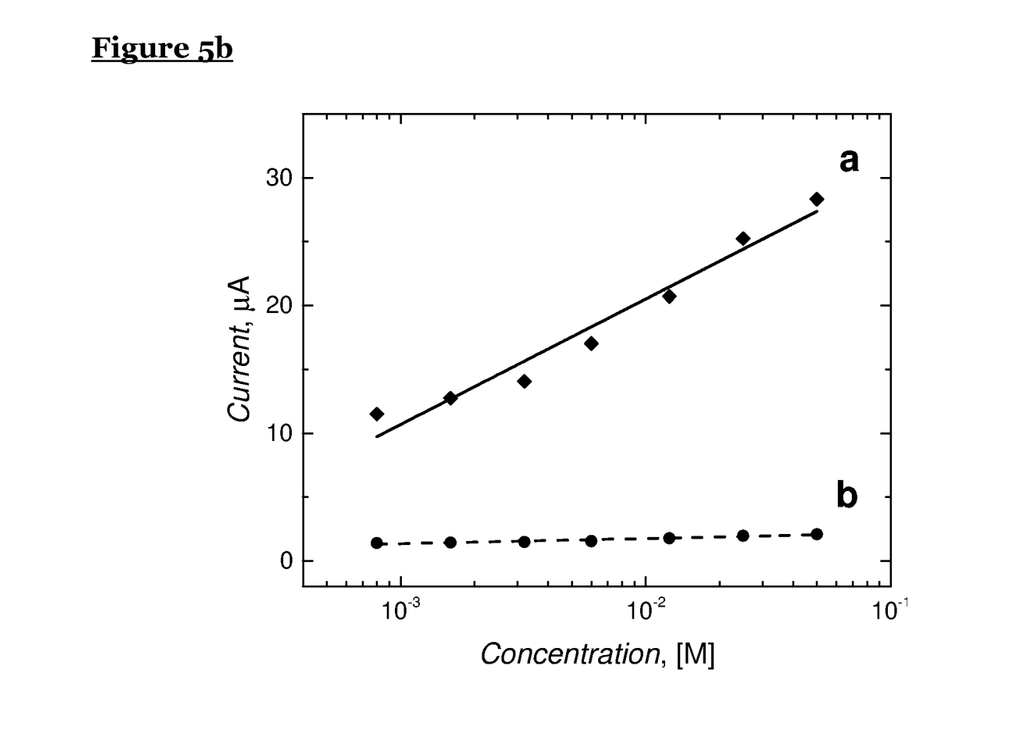
FIG. 5b shows calibration curves for glucose, response for the (a) nanoMIPs imprinted with glucose and (b) nanoMIP imprinted with dopamine.
Figure 6:
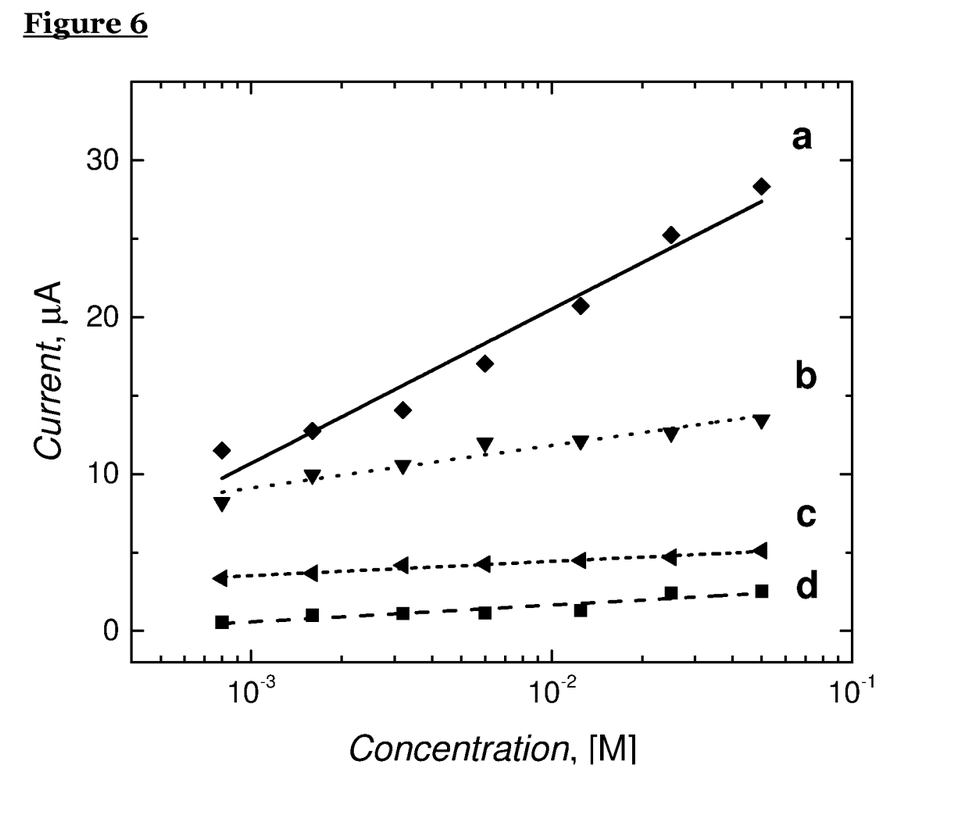
FIG. 6 shows a nanoMIPs glucose sensor response for (a) glucose, (b) fructose, (c) maltose and (d) lactose in linear concentration range from 0.8 to 50 mM in 5 mM PBS

DPV responses of nanoMIP-coated electrodes to glucose solutions are presented in FIG. 5a. For control measurements a polymer imprinted with dopamine, which was prepared using the method of example 7 but replacing the glucose with dopamine, was used. The control polymer known as non-specific imprinted polymer (NIP) reflects as expected a negligible response (24 times lower), see FIG. 5b. Additionally, the glucose sensor does not show high level of cross reactivity for fructose, maltose and lactose, see FIG. 6.

Conclusion

The inventors have shown that it is possible to synthesise MIPs imprinted with an analyte and comprising ferrocenylmethyl methacrylate (FMAA), a redox label. The inventors have shown that the diameter of the MIPs changes depending upon whether or not the analyte is present, as shown schematically in FIG. 1.

Figure 2:
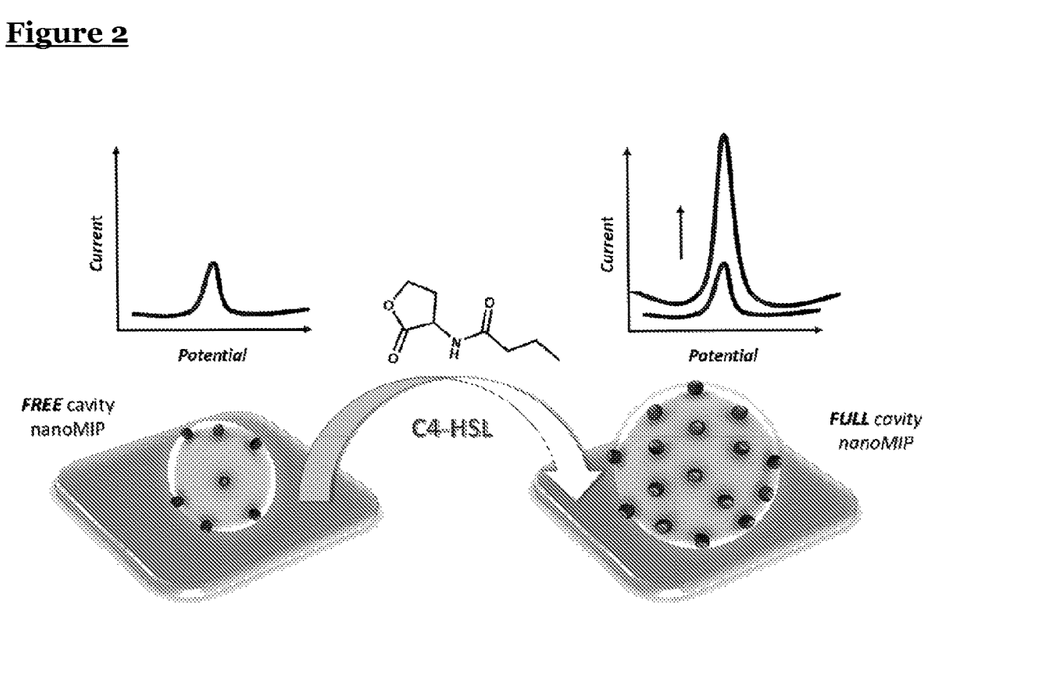
FIG. 2 shows a schematic representation of the template-induced change in the quantity of anchored redox markers exposed on an electrode surface.

The MIPs may be immobilised on a first electrode. The first electrode and a second electrode may then be placed in a solution and a potential difference applied across them. As the concentration of the analyte varies the volume of the MIPs also vary, changing the number of redox labels which contact the electrode, as shown in FIG. 2. This in turn causes the current which passes between the first and second electrodes to vary, allowing the concentration of the analyte to be accurately calculated.

REFERENCES (1) Chianella, I. et al., Anal. Chem., 2013, 85, 8462.
(2) Poma, A. et al., Adv. Functional. Mat., 2013, 23, 2821.
(3) Leach, A. R. Molecular modelling: principles and applications; Pearson education, 2001.
(4) Mazzotta, E. et al., Sens. Actuat. B: Chemical, 2016, 229, 174.
(5) Canfarotta, F.; Poma, A.; Guerreiro, A.; Piletsky, S. Nature Protocols 2016, 11, 443.
(6) Chen, L. et al., Applied Surf. Sci., 2017, 406, 115.
(7) Poma, A.; Turner, A. P. F.; Piletsky, S. A. Trends in Biotechnol., 2010, 28, 629.
(8) Greenberg, E. P.; Whiteley, M.; Diggle, S. P. Nature 2017, 551, 313.
(9) Hawver, L. A.; Jung, S. A.; Ng, W.-L. FEMS Microbiology Rev., 2016, 40, 738.
(10) Kumari, A. et al., Anal. Chem., 2006, 78, 7603.
(11) Zhang, X., et al., Biosens. Bioelectron., 2018, 105, 29-35.
(12) Prasad, B. B., Jaiswal, S., Singh, K. Sens. Actuat. B: Chemical, 2017, 240, 631-639.
(13) Iacob B.-C. et al., Electrochimica Acta, 2016, 217, 195-202.
(14) Rick, J., Chou, T.-C. Biosens. Bioelectron., 2006, 22, 544-549.
(15) Wong, A. et al., Electrochim. Acta, 2015, 182, 122-130.
(16) Canfarotta, F., Rapini, R., Piletsky, S. Current Opin. Electrochem., 2018, 7, 146-152.
(17) Rebocho, S., Cordas, C. M., Viveiros, R., Casimiro, T. J. Supercrit. Fluids, 2018, 135, 98-104.
(18) Poma, A., Turner, A. P. F., Piletsky, S. A. Trends Biotechnol., 2010, 28, 629-637.
(19) Canfarotta, F., Poma, A., Guerreiro, A., Piletsky, S. Nat. Protocols, 2016, 11, 443-455.
(20) Mazzotta, E. et al., Sens. Actuat. B: Chemical, 2016, 229, 174-180.
(21) Khor, S. M., et al., Biosens. Bioelectron., 2011, 26, 2038-2044.

The invention claimed is:

1. An electrochemical sensor comprising first and second electrodes, wherein the first electrode has a molecular imprinted polymer (MIP) immobilized on a surface thereof due to the presence of one or more covalent bonds, and the MIP is a nanoMIP that comprises a redox label and is imprinted with an analyte, wherein the nanoMIP is a particle with a diameter between 1 nm and 999 nm.

2. The electrochemical sensor according to claim 1, wherein the analyte is selected from the group consisting of: a bioanalyte, a pharmaceutical, a pesticide, and an explosive.

3. The electrochemical sensor according to claim 1, wherein the analyte is selected from the group consisting of: a carbohydrate, an oligosaccharide, a polysaccharide, a protein, a peptide, a nucleoprotein, a mucoprotein, a lipoprotein, a synthetic protein, a glycoprotein, a glucosaminoglycan, a steroid, a hormone, an immunosuppressant, heparin, an antibiotic, a vitamin, a biomarker of a pathological or disease state, a toxin, a pesticide, an herbicide, an insecticide, a fungicide, an explosive, a nerve agent, a pollutant, an endocrine disrupting compound, a nucleotide, a nucleoside, an oligonucleotide, a metabolite, a secondary metabolite, a drug metabolite, a drug intermediate, or and a drug.

4. The electrochemical sensor according to claim 1, wherein the redox label is a dye, a quinone, a free transition metal, a conjugated π-electron molecule, a complex with d- and f-electrons, a carbon nanotube, or graphene.

5. The electrochemical sensor according to claim 1, wherein the redox label is a transition metal compound or complex.

6. The electrochemical sensor according to claim 5, wherein the redox label comprises a metallocene, and/or a ferrocene.

7. The electrochemical sensor according to claim 6, wherein the redox label comprises ferrocenylmethyl methacrylate (FMMA).

8. The electrochemical sensor according to claim 1, wherein the MIP is configured to swell and/or shrink upon binding of the analyte.

9. The electrochemical sensor according to claim 1, wherein the electrochemical sensor is configured to detect the concentration of redox labels exposed to the first electrode by detecting a signal response.

10. The electrochemical sensor according to claim 1, wherein the redox label is a molecule, or a component part of the MIP, which is capable of undergoing an oxidation or reduction reaction.

11. An electrode with a molecular imprinted polymer (MIP) immobilized on a surface thereof due to the presence of one or more covalent bonds wherein the MIP is a nanoMIP, comprises a redox label and is imprinted with an analyte, wherein the nanoMIP is a particle with a diameter between 1 nm and 999 nm.

12. A method of detecting an analyte, the method comprising:
disposing first and second electrodes in a solution comprising an analyte, wherein the first electrode has a molecular imprinted polymer (MIP) immobilized on a surface thereof due to the presence of one or more covalent bonds, and the MIP is a nanoMIP that comprises a redox label and is imprinted with the analyte, wherein the nanoMIP is a particle with a diameter between 1 nm and 999 nm;
allowing the analyte to bind to the MIP; and
measuring a signal response to confirm the presence of the analyte.

13. The method according to claim 12, further comprising the step of comparing the signal response to one or more signal responses caused by a known concentration of the analyte and thereby determining the concentration of the analyte.

14. The method according to claim 12, wherein the signal response is a change in potential difference, impedance, capacitance, and/or current between the first and second electrodes.

* * * * *